Sept. 1, 1970   A. B. SARKIS   3,526,127

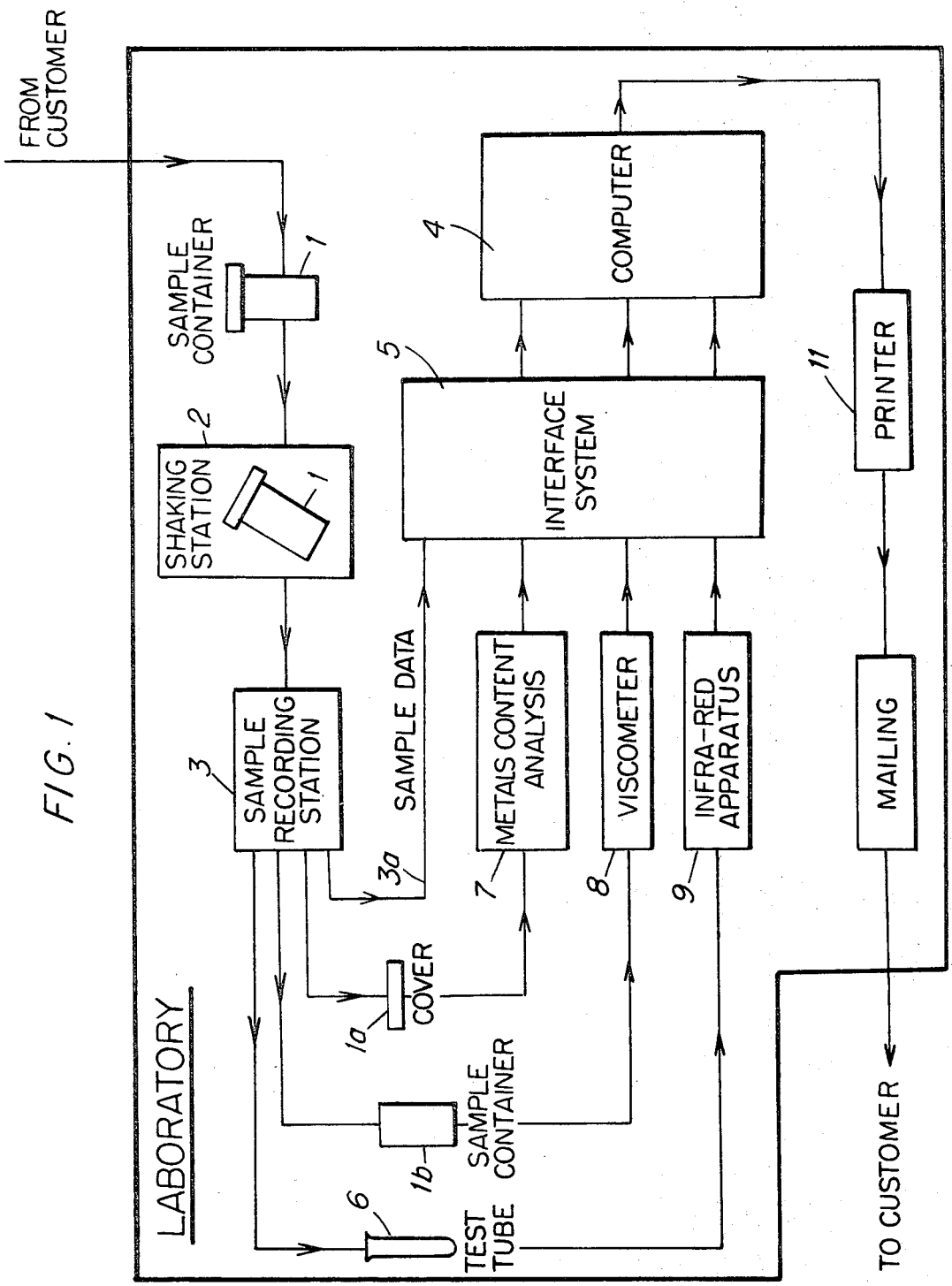

ENGINE OIL ANALYSIS SYSTEM

Filed March 24, 1969   5 Sheets-Sheet 2

Mobil    action code   EM/PA

0. ALL RESULTS NORMAL, CONTINUE PRESENT PRACTICES

1. LOW OIL VISCOSITY
   Check For: Excessive fuel dilution or lower SAE grade oil used as make-up.

2. HIGH OIL VISCOSITY
   Check For: Excessive contaminant or degraded oil or higher SAE grade oil used as make-up.

3. EXCESSIVE FUEL DILUTION
   Check For: Inadequate crankcase ventilation; low engine temperature for any reason; excessive idling; low compression pressure
   Diesel — Injector dribble; defective spray pattern; worn injection pump; leaking transfer pump seals; leaking fuel lines.
   Gasoline — Rich mixture (faulty choke, high float level, worn jets, high pump pressure, restricted air cleaner); leaky fuel pump; leaky carburetor gaskets; faulty ignition (plugs, coil, distributor, wiring, timing).

4. EXCESSIVE WATER
   Check For: Inadequate crankcase ventilation; low engine temperatures for any reason; outside contamination; cooling system leaks.

5. GLYCOL FROM COOLING SYSTEM LEAKS
   Check For: Leaking gasket; loose head; cracked head or block; leaking sleeve seals; leaking oil cooler.

6. EXCESSIVE OIL OXIDATION
   Check For: High engine oil or water temperatures; loose belts; clogged radiator core; collapsed hoses; faulty shutters; faulty thermostat; faulty pressure cap; jacket scale; lean mixture; improper timing; overload; preignition; detonation.

7. EXCESSIVE OIL NITRATION
   Check For: Inadequate crankcase ventilation; plugged PCV System; excessive blowby; improper air/fuel ratio; faulty ignition; improper timing.

8. INSPECT FOR ENGINE PARTS WEAR

9. INSPECT FOR CHROMED PARTS WEAR ESPECIALLY RINGS. CHECK FOR LEAKAGE OF COOLING WATER IF TREATED WITH CHROMATES

10. INSPECT FOR ALUMINUM PARTS WEAR. ALSO CHECK DIRT CONTAMINATION

11. INSPECT FOR BEARING WEAR

12. SERVICE AIR CLEANER AND CONNECTIONS OR CHECK OUTSIDE CONTAMINATION

13. CLEAN AND FLUSH ENGINE

14. ABNORMAL RESULTS, MODIFY PRESENT PRACTICES

Inventor
Albert B. Sarkis

Inventor
Albert B. Sarkis

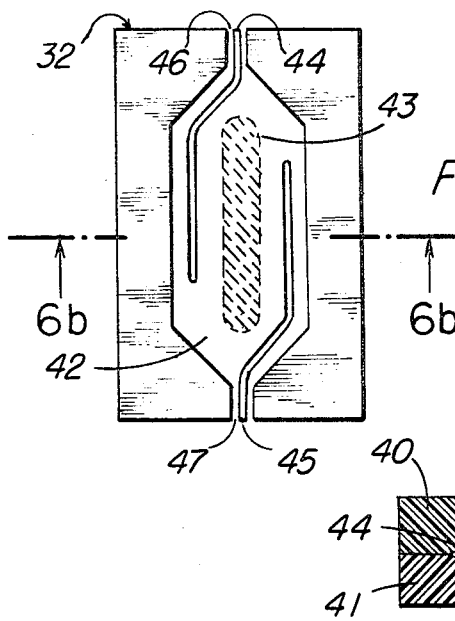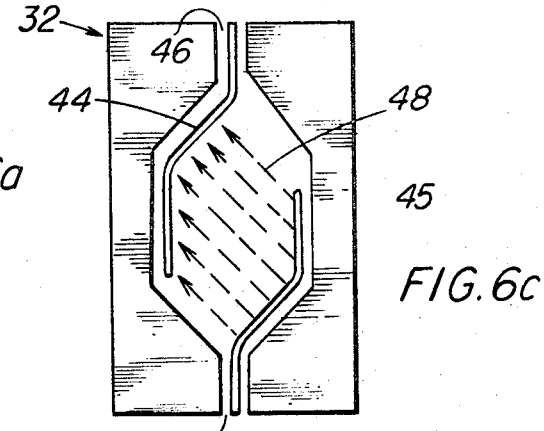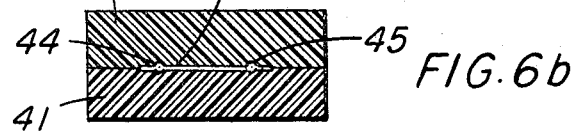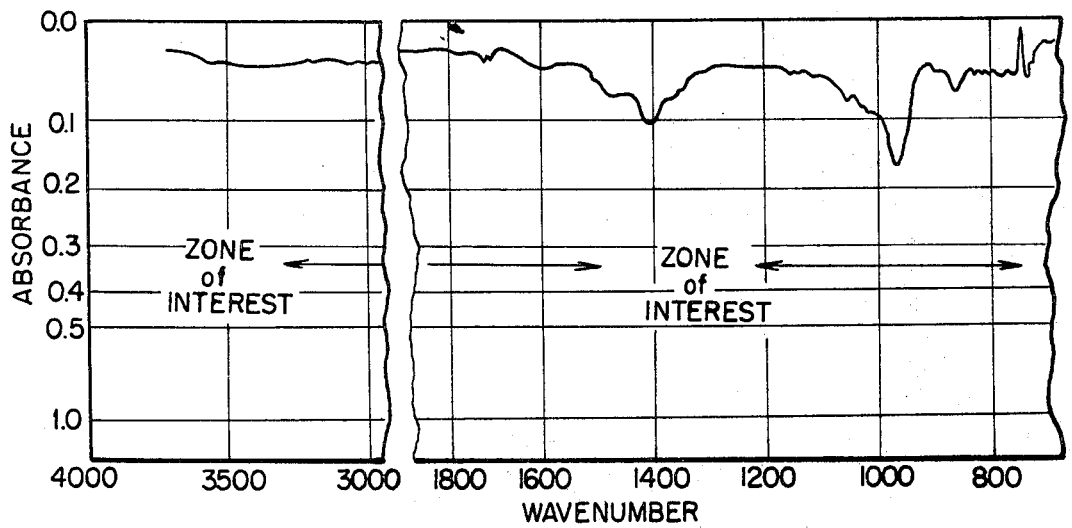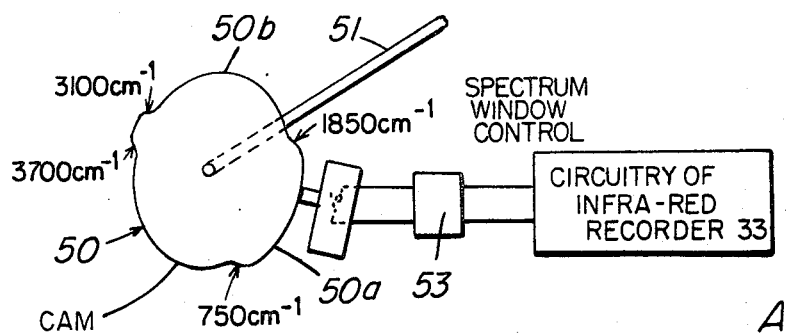

United States Patent Office 3,526,127
Patented Sept. 1, 1970

3,526,127
ENGINE OIL ANALYSIS SYSTEM
Albert B. Sarkis, New Hyde Park, N.Y., assignor to Mobil Oil Corporation, a corporation of New York
Filed Mar. 24, 1969, Ser. No. 809,658
Int. Cl. G01n 21/34, 33/30; F16n 29/00
U.S. Cl. 73—64                    21 Claims

ABSTRACT OF THE DISCLOSURE

A computer analyzes and inter-relates data relating to viscosity, infra-red characteristics and metal content of an oil sample and provides output data corresponding to the condition of the engine and of the engine oil. The output data is fed to a printer for providing a report form summarizing the condition of the engine and of the engine oil.

---

This invention relates to engine oil analysis apparatus and more particularly to a computerized analysis system including an improved infra-red analysis apparatus for analyzing the various characteristics of a plurality of oil samples.

An effective oil analysis program should measure oil contamination and deterioration in order to determine the engine condition and operation. The ultimate goal is to optimize oil life, optimize engine life, optimize filter life and to minimize maintenance costs. One usage of engine oil analysis is to establish realistic oil drain intervals by evaluating oil condition and relating it to the control limits at which the build-up of deposits on critical engine parts begins to accelerate. By means of an effective oil analysis program, by sampling approximately 10% of the engines in a given fleet, for example, the optimum oil drain intervals may be accurately established in order to optimize oil, filter and engine performance by ensuring that the used oils are removed at the right time.

An effective oil analysis program can also be used to determine the causes of various engine problems which may be encountered. For example, if a particular unit repeatedly encounters an engine problem, an oil analysis program could be run on that unit in order to determine the causes of the engine problems.

Also, an effective oil analysis program is useful in diagnosing engine problems and trends in order to determine engine malfunctions which can be corrected early, through minor maintenance and with a minimum cost, before the malfunction gets progressively worse. Thus, an engine oil analysis program can act as an "early warning system" to avoid major maintenance work and to avoid premature engine overhauls. An effective oil analysis program may also be used to indicate what is likely to go wrong in an engine. For example, an oil analysis program may enable the detection of faulty fuel injectors before an engine's power ebbs and of bearing wear before the engine throws a rod.

The key criterion for a successful engine oil analysis program for diagnosing engine problems and trends, are: metals analysis for measuring engine wear and outside contaminants; glycol and water analysis for measuring cooling system leaks; fuel dilution analysis for detecting fuel system or combustion problems; oil viscosity, oxidation and nitration analysis to determine oil degradation and its causes. In an effective system, all of these criterion should be determined and correlated in order to provide a synopsis of the interrelated conditions of the engine and oil.

Various engine oil analysis techniques are known, but the drawback of these known techniques is that a relatively low number of samples could be tested in a workday, thus, increasing the cost of each individual analysis. The previously known systems are not sufficiently automated and are thus not economically feasible for use on a large scale.

Therefore, the main object of this invention is to provide an engine oil analysis system whereby a large number of samples can be economically analyzed in a work day.

Another object of this invention is to provide an automated engine oil analysis system which automatically provides a report summarizing the results of the oil analysis and indicating the condition of the oil and engine.

Still another object of this invention is to provide an automated infra-red analysis apparatus for automatically and successively determining the infra-red spectrum of a plurality of engine oil samples.

SUMMARY OF THE INVENTION

According to a first aspect of this invention, apparatus for automatically analyzing a plurality of oil samples and for reporting the results thereof, comprises means for successively determining the metal content of a plurality of oil samples, a viscometer for measuring the viscosity of the oil samples, and means for successively determining the infra-red absorbance characteristics of a plurality of oil samples. Further provided is a digital computer apparatus and means for feeding the results of the viscosity, metals and infra-red analyses to the computer. The computer stores reference information regarding limit values of viscosity, metals content and infra-red characteristics of oil and includes means for comparing the results of said analyses with stored reference information. The computer further stores evaluation criterion correlating comparative values of viscosity, metals content and infra-red characteristics of the oil. The comparison results are then related with the evaluation criterion and a report form indicating the condition of the oil samples is generated.

According to a second aspect of this invention, an infra-red analysis means includes a sample station, a reference cell and a sample cell. Means are provided for automatically and successively positioning a plurality of samples at the sample station and for feeding the sample positioned at the station to the sample cell. The infra-red apparatus then determines the infra-red characteristics with respect to the reference cell, of the sample positioned at the sample station. The next sample is positioned at the sample station after the spectrum of the previous sample has been recorded.

According to yet another aspect of this invention, an improved sample cell is provided for an infra-red analysis system or the like. The sample cell according to the present invention is capable of having a high viscosity fluid purged therefrom in a relatively short period of time and includes first and second substantially transparent elements secured together and defining a sample chamber therebetween. According to the invention, at least one groove is formed in one of the elements within the chamber to enable a sample, after being tested, to be quickly purged from the sample cell.

BRIEF DESCRIPTION OF THE DRAWINGS

FIG. 1 is a block diagram of the computerized oil analysis apparatus according to the present invention;

FIG. 2 is a typical report form indicating the results of the oil analysis;

FIG. 3 is an action code list used with the report form of FIG. 2;

FIGS. 6a, 6b and 6c are illustrations of the improved sample cell according to the present invention;

FIG. 7 ilustrates the cam and switch arrangement for an infra-red recorder according to the present invention to record only the "zones of interest" in the infra-red spectrum; and FIG. 8 illustrates a typical infra-red chart pattern recorded on the apparatus of the present invention.

DESCRIPTION OF SPECIFIC EMBODIMENTS

Figure 4:
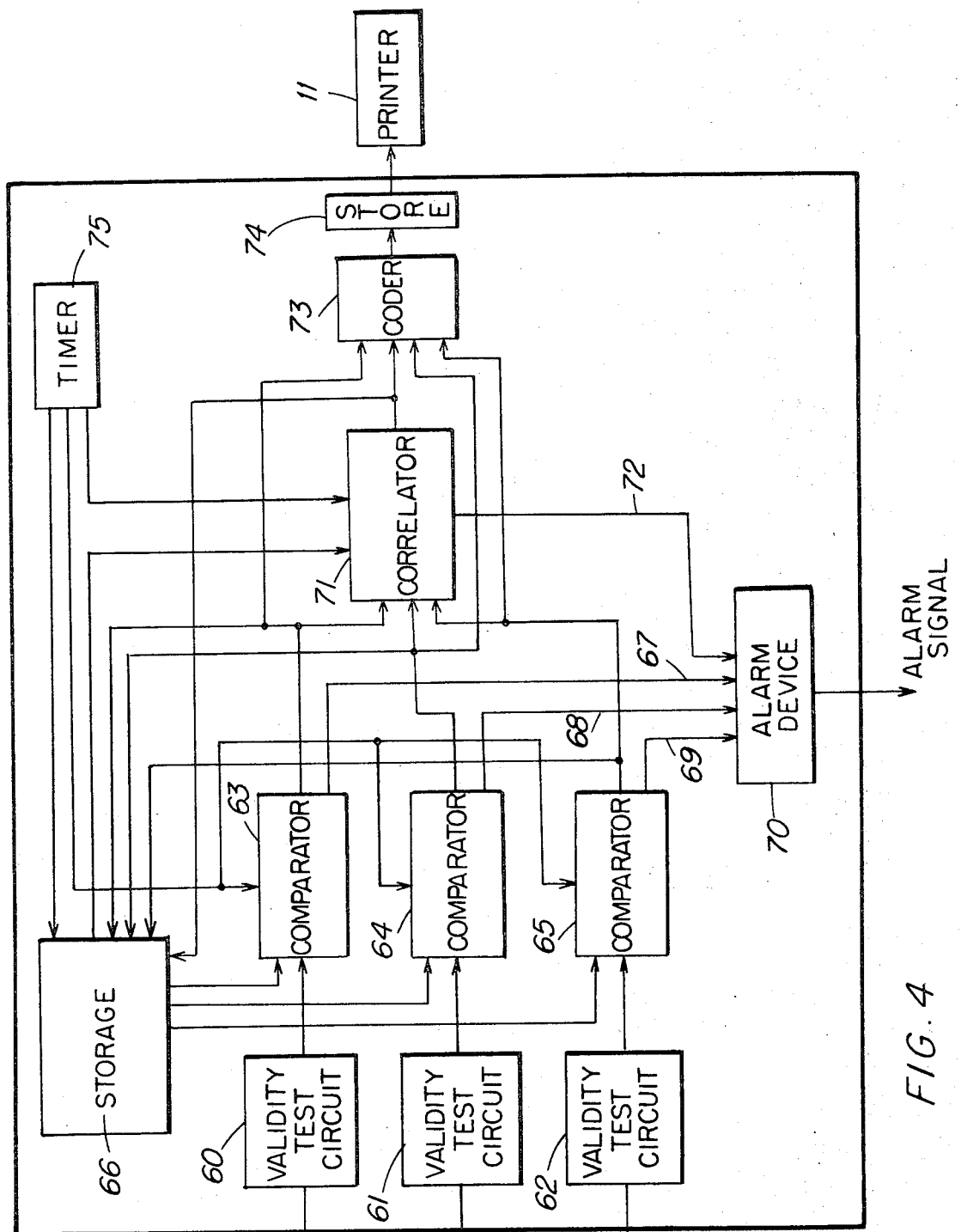
FIG. 4 is a general block diagram of the computer portion of the apparatus of FIG. 1.

Referring to FIG. 1 there is shown a major block diagram of the computerized oil analysis apparatus according to the present invention. A sample container 1 is received from the customer and is agitated at shaking station 2. The sample container 1 is passed to a sample recording station 3 wherein sample data, such as data pertaining to the type of oil, type of engine and the customer, is recorded. The sample data is fed to a computer 4 via line 3a and an interface system 5 to check the reliability of the recorded information. The computer 4 also prints three small sample labels imprinted with the laboratory number of the sample. The sample is then split into three portions, one portion being placed in a small test tube 6 or the like, and the second being placed in the sample container cover 1a, or any other suitable container, and the third remaining in the main body 1b of the sample container.

The sample portion in the cover 1a, to which a sample label is attached, is fed to apparatus, such as a direct reading spectrometer 7 (i.e., a Baird-Automatic DRS apparatus), wherein the concentration of metals, in digits representing p.p.m., is determined. The information coresponding to the metals concentration is transmitted through the interface system 5 into the computer 4. The computer 4 checks the validity of the data from the direct reading spectrometer 7 and either accepts or rejects it. Other devices for measuring the metals content of the oil may be used. Typical examples are: atomic absorption devices, X-ray fluorescence devices, neutron activation devices, etc.

Metals analysis measures parts per million (p.p.m.) content of iron, chromium, aluminum, lead, copper, and silicon to determine the wear rates of oil-wetted parts and mechanical faults. Excessive or sharply escalating p.p.m.'s of the metals signify that wear rates of corresponding metal components in the engine are abnormally high. An overly high silicon measurement means too much abrasive dirt is entering the oil. As submicroscopic metal particles abrade from parts surfaces, they are borne away and retained in the oil. Even the finest micron filters will not remove all of these particles. By measuring the concentration of these metallic wear elements in an oil sample from an engine, the wear rates of the corresponding metal parts can be gauged to determine whether wear is normal or excessive. For example, a moderate concentration of chrome particles in an oil sample may indicate that the chromium rings of an engine are wearing at a normal rate. But a heavier concentration may point to severe wear.

The oil in the sample container 1b is fed to a viscometer 8, such as the special Brookfield viscometer. At the viscometer station 8, an operator records the measured torque and ambient temperature, and this information, including information identifying the sample is transmitted to the interface system 5, wherein the information is encoded and converted into computer compatible information. The interface system 5 then feeds the converted information to the computer 4 which checks the validity of the data and then accepts or rejects it.

The viscosity analysis detects significant thinning or thickening of the oil due to contamination, deterioration or use of the wrong type of oil.

The sample in test tube 6 is fed to an infra-red analysis station 9 which automatically determines the characteristics of the pertinent portions of the infra-red spectrum and feeds the information to the interface system 5 which in turn couples the information to the computer 4. The details of the infra-red station 9 according to the present invention will be discussed below with reference to FIG. 5 and an embodiment of computer 4 will be described in detail hereinbelow.

Infrared analysis determines the content of fuel, water, glycol, and the extent of oil deterioration in terms of oxidation and nitration. Abnormal measurements indicate faulty or malfunctioning engine components, poor timing, cooling system leakage, or overheating. Degraded oil will cause deposit build-up in the engine and impair lubrication.

In the infra-red analysis station 9, the oil sample is subjected to varying wavelengths of infra-red light. Each contaminant compound in the oil absorbs a ray of infra-red of a particular wavelength. Determining the amounts of light absorbed by the various contaminants, the instrument 9 feeds the appropriate data to computer 4 and, optionally, prepares a chart, that shows precisely how much fuel, water, glycol, and the products of oil oxidation and nitration are present in the sample. As with metallic elements, reference criteria have been established for various contaminants, thus enabling the determination of abnormal conditions by the computer 4.

A high oxidation rate may be a symptom of excessive engine heat. Heavy concentrations of fuel, water, and glycol have many causes, including improper fuel atomization, low temperature operation of the engine or cooling system leaks.

Computer 4, which may be an IBM S–360, stores reference information regarding limit and trend values of viscosity, metals content and infra-red characteristics of the oil samples. A detailed embodiment of computer 4 will be described below with reference to FIG. 4. The computer 4 also stores evaluation criterion correlating comparative values of viscosity, metals content and infra-red characteristics of oil. From the results of the various tests, as related to the trend and limit values and to the evaluation criterion, the condition of the oil and/or the engine from which it was removed can be ascertained. The method and apparatus by which the computer makes these determinations are described hereinbelow.

The computer 4 receives information relating to the oil samples. The computer 4 compares the received data and the results of the analysis thereof against limits, reference values and trends, signals alerts, selects action codes, and, if any extremely abnormal condition exists, provides alert reports instantaneously. Alert reports are generated only if an emergency condition exists. If any alert reports are provided, the laboratory supervisor immediately phones or wires the customers whose units are on alert due to abnormal results and verbally communicates the necessary action to be taken for corrective maintenance or the like. In the preferred embodiment, the results of the evaluations by computer 4 are stored until a predetermined number of samples have been analyzed, whereupon a set of report forms are generated.

The computer 4 feeds the stored evaluation results to a printer 11 for printing out a set of report forms for the samples. Blank report forms are mounted on a high-speed printer 11 which receives input information from the computer 4. The report forms are then mailed to the customer.

The report form, a sample of which is illustrated in FIG. 2, provides a tabulation of the type of oil, characteristics of the engine from which it was removed and the results of all of the tests performed on the oil sample, thus summarizing the condition of the oil and of the engine. The column labeled "action code" is also printed out by the computer and acts as an aid in determining causes of engine oil condition and engine malfunctions. The action code is determined by the computer by not only evaluating the results of each individual test performed on the oil, but by also correlating and evaluating various combinations of test results. A typical action code list is illustrated in FIG. 3.

It is pointed out that computer 4 may be a laboratory computer for use solely with the oil analysis system or may be a time shared computer, such as a time shared corporation computer, which is only partially utilized in the oil analysis system. Alternatively, computer 4 may comprise a pair of computers, one being used solely with the oil analysis system and the other being a time shared computer which communicates with the first computer 4. Communication between the pair of computers could be via telephone lines or the like. When a pair of computers is used, the local computer (the one used solely in the oil analysis system) is used for general housekeeping chores, for determining validity of data for storing data to be analyzed, for storing the results of the analyses and for printing out alert reports and report forms from data received from the remote computer. The remote time-shared computer is used to store reference, limit and trend data and for performing the more complex analysis of the results of the various tests to arrive at action codes and alert conditions. The local computer can store data for a plurality of samples, send the stored data to the remote computer for analysis, and then store the results of the analysis which is then used to print out reports. Thus, the local computer may be a far less expensive unit than the remote computer, since no complex data processing is performed therein.

FIG. 4 illustrates a general block diagram of a particular embodiment of the computer 4 shown in FIG. 1. The data from the spectrometer 7, viscometer 8 and infrared system 9 (of FIG. 1) is fed to the computer 4 via interface device 5. The interface device 5 supplies signals to data validity test circuits 60, 61 and 62, located in computer 4, which check the validity of the data relating to the viscosity, metals content and infrared characteristics, respectively, of the oil being tested. The data validity test circuits 60–62 check the data format and/or the nature of the data itself to determine whether or not valid data is being supplied by the interface system 5. The outputs from the data validity test circuits 60–62 are coupled to comparators 63–65, respectively, wherein the respective data is compared with limit and reference values to determine if any abnormal condition exists. The data is also compared with previous data for oil taken from the same engine to determine if any trends are developing. The limit trend and reference values are stored in storage member 66 and fed to comparators 63–65. If an extremely abnormal trend or condition is detected by any of the comparators 63–65 which indicates a dangerous condition of the engine from which the oil was extracted, an alarm signal is fed to an emergency condition alarm device 70 via lines 67–69, respectively. Alarm circuit 70 then generates an alarm signal which signals the operator of the system to immediately alert the owner or operator of the vehicle from which the oil sample was taken to apprise him of the emergency situation. When an alarm signal is generated, the system operator generally will telephone or cable the customer to apprise him of the emergency condition.

The outputs of comparators 63–65 are fed to storage 66 wherein the results of the analysis are stored with the results of previous samples from the same engine. The outputs of comparators 63–65 are also fed to a correlator 71 which compares various combinations of the results of the comparisons performed in comparators 63–65 with trend and reference information stored in the storage 66. Correlator 71 provides the results of the correlation of data to a coder 73. The correlator 71 also determines if any trends are developing and if any combination of conditions existing in the engine indicate a dangerous condition. If a dangerous trend or condition is detected, the correlator 71 provides an output signal to emergency condition alarm device 70 on line 72 and alarm device 70 generates an alarm signal to alert the system operator to notify the customer of the dangerous condition.

As an alternate, validity circuits 60–62 could be replaced with one circuit, and the comparator circuits 63–65 could be replaced with one circuit. The information from the three oil analysis stations can then be alternately or sequentially fed through the same high speed circuit.

The outputs of the correlator 71 and the output of the comparator devices 63–65 are applied to a coding device 73 wherein the outputs of the correlator 71 and comparator devices 63–65 are coded into action codes and other quantities relating to oil and engine condition which appear on the Report Form shown in FIG. 2. The output of the coder 73 is applied to a storage unit 74, the output of which is applied to the printer 11 (also shown in FIG. 1).

The operation of computer 4 is under control of a timing device 75 which controls the transfer of information between the various portions thereof. A detailed description of timer 75 is not believed to be necessary to enable one ordinarily skilled in the art to practice the present invention. The timer 75 may also be under control of a program.

The provision of storage unit 74 is optional and is used in the disclosed embodiment for storing up information regarding a plurality of engine oil samples. The information stored in storage unit 74 is read out and a plurality of report forms are printed out by means of printer 11. This configuration enables the printer 11 to be used for other purposes during idle periods. Alternatively, the output of coder 73 can be fed directly to printer 11 so that the respective report forms are printed out after each sample is analyzed on a one-by-one basis. In this latter case, printer 11 must be "on-line" substantially all of the time and cannot be conveniently time-shared for other purposes.

The various circuit elements of FIG. 4 have not been described in detail since the particular design of each individual block is within the skill of those ordinarily skilled in the art. For example, the validity test circuits 60–62 may include comparison devices to check whether or not the input data falls within a predetermined range or ranges, and circuitry to check the format of the data itself (that is, whether the data word supplied by interface 5 is of the right length, includes proper codes, etc.). The comparator circuits 63–65 include circuitry to compare data from the validity test circuits 60–62 with reference, trend and limit data stored in storage unit 66. The comparator circuits 63–65 also include circuitry for detecting emergency conditions. The emergency detecting circuits within comparators 63–65 comprise a decoding circuit, such as a matrix circuit, which is responsive to predetermined data configurations which indicate emergency conditions.

The correlator device 71 includes comparison circuits for comparing various combinations of inputs from comparators 63–65 with reference, trend and limit data from storage 66. The correlator circuit 71 also includes a decoding circuit for detecting predetermined data configurations which indicate emergency conditions and for feeding an appropriate signal to alarm device 70. The coder 73 receives input information relating to the tests performed on a respective oil sample, combines the information, detects the existence of various conditions and of various predetermined combinations of conditions and provides coded data results which is compatible to be fed to the printer 11 for printing out the report form of FIG. 2. The coding device 73 may include a matrix type of coder which provides various output signals in response to predetermined individual input signals and to predetermined combinations of input signals.

The alarm device 70 may be further provided with means (not shown) for indicating to the operator of the system the exact emergency condition which exists in the oil so that the customer may be notified accordingly. Also a printed-out alarm form may be generated by means not shown.

After the report form of FIG. 2 is printed out by printer 11 in accordance with the computerized evaluation of the input data, the report form, along with an action code list (FIG. 3) is sent to the customer. Asterisks are placed at abnormal readings. The action code list enables the customer to easily and quickly interpret the report form to determine if corrective or preventive maintenance on the engine is necessary.

Comparisons of oil characteristics with those of previous samples from the same engine are made to determine significant trends or abnormal condtions.

Normal trends of oil characteristics at various operating hours of engines have been established. By comparing current trends of an oil sample against these reference trend values, abnormal trends can be detected. Sharp rises in wear element p.p.m.'s from one oil sample to the next may suggest excessive wear, and perhaps a runaway condition that could cause early engine failure. Levels of results for the same oil in various engines in different applications can be used to determine new oil formulation improvement objectives. Trend analysis of the results of various quality level oils in any one make and model engine can be used to determine the relative severity of that engine and its optimum oil requirement.

If desired, an additional storage device may be coupled to the validity test circuits 60–62 to store test data for a plurality of oil samples. After a predetermined number of samples have been tested, the computer can then analyze the data stored in the additional storage device as described above. This enables the computer to be used for other purposes while test data is being accumulated. If storage unit 66 of FIG. 4 is large enough, the input data could be fed thereto until a sufficient amount of data has been accumulated. This more efficiently utilizes the computer 4.

Figure 5:
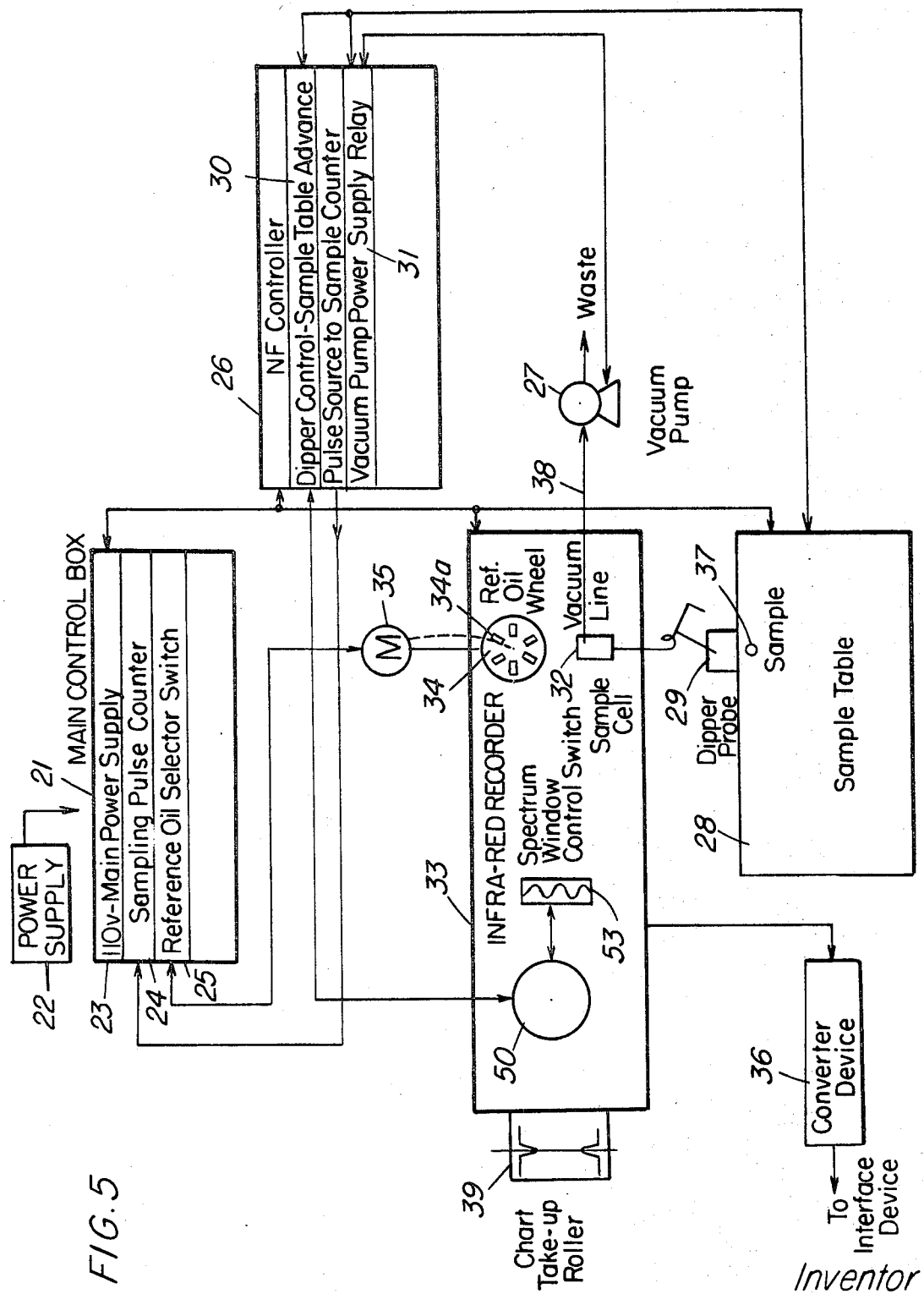
FIG. 5 is a block diagram of an automatic infra-red analysis apparatus according to the present invention.

Referring to FIG. 5, there is shown an automatic infrared analysis apparatus according to the present invention which automatically and successively determines the characteristics, such as the infra-red absorbance characteristics, for pertinent portions of the infra-red spectrum for a plurality of oil samples. The infra-red apparatus, in the described embodiment, includes a main control box 21, and infra-red recording apparatus 33, an NF controller 26, a vacuum pump 27 and an automatic feeding sample table 28, all interconnected as described below. The main control box 21 is connected to a power source 22, which generally is 110 volts A.C. The main control box 21 distributes power to the other elements in the automatic infra-red apparatus via power supply distributor 23. The main control box further includes a sampling pulse counter 24 which counts the number of samples operated on by the system. Further included is a reference oil selector switch 25 for changing the reference oil with respect to which the infra-red analysis is made by infra-red recorder 33. The reference oil selector switch 25 may be programmed in conjunction with the sampling pulse counter 24 so that after a predetermined number of oil samples of a first type are analyzed, the reference oil in the infra-red recorder 33 will be automatically changed as described below so that a second type of oil can be analyzed. Many different designs of the reference oil selector switch 25 and sampling pulse counter 24 may be provided.

The main control box 21 is coupled to an NF controller 26 which is coupled to a vacuum pump 27 and to an automatic feeding sample table 28. A dipper probe mechanism 29 is coupled to sample table 28. The combination of the NF controller 26, sample table 28 and dipper probe 29 is a modified NF input system, Part No. 310–0062, manufactured by Perkin-Elmer. The various modifications were made to suit the particular application and all of the modifications are not described in detail herein. The NF controller 26 includes a dipper probe control-sample table advance control 30 which automatically causes the sample table 28 to advance the next sample to the dipper station and to cause the dipper probe 29 to dip into said next sample in properly timed relationship. The NF controller 26 was modified to include a vacuum pump power source 31 which causes the vacuum pump 27 to operate in timed relationship with the sample table 28 and dipper probe mechanism 29. The vacuum pump 27 is connected to a sample cell 32 (in the infra-red recorder 33) which in turn is coupled to the dipper probe 29. The NF controller 26 is also modified to provide a pulse signal to the sampling pulse counter 24 in timed relationship with the sampling operation of the system.

The infra-red recorder 33, in this embodiment, is a modified Perkin-Elmer Model 457 infra-red spectrophotometer apparatus. The output of the spectrophotometer is fed to a converter device 36, available from Perkin-Elmer, for converting the output of recorder 33 to computer compatible data. Other infra-red analysis devices which are compatible with the inventive concept disclosed herein may also be used.

In operation, the infra-red recorder 33 compares the infra-red characteristics of a sample oil which is fed to sample cell 32 against the infra-red characteristics of a reference oil contained in a reference cell, such as one of the reference cells 34a mounted on the reference wheel 34. The result of the comparison is electrically fed to computer 4 for analysis. The result of the comparison may also be printed out on a chart recorder which is part of the infra-red recorder 33 in this embodiment. The chart may be read to provide input information to the computer or may be read by an operator to check the system operation. If the computer fails, the chart may be read by an operator and analyzed manually. However, the manual analysis will be rather crude, and due to complexity of the analysis, accurate correlation with other data cannot be handled in a satisfactory manner.

The modification to the basic infra-red recorder 33 include the addition of an automatically or manually controlled reference oil wheel 34 carrying a number of reference oil cells 34a, which is coupled to reference oil selector switch 25 for placing the correct reference oil cell 34a, with respect to which the sample oil is being checked, in the proper position in the infra-red apparatus 33. For each type of oil sample being checked, a different reference oil is required. Each reference cell 34a contains a different type of reference oil. The position of the reference oil wheel 34 may be varied manually or in accordance with a predetermined program, as determined by the characteristics of the reference oil selector switch 25 and sampling pulse counter 24. A motor 35 is coupled between the reference oil selector switch 25 and the reference oil wheel 34. Other control devices could be used in place of motor 35, which is shown only by way of example. Instead of manually replacing the sample in recorder 33, as is presently done in the art, the mechanized and programmable reference wheel configuration shown in FIG. 5 was devised. This saves a substantial amount of time and enables unattended operation when analyzing a plurality of types of oil samples.

In order to program the reference oil wheel 34, the sampling pulse counter 24 in the main control box 21 may include six individual counters, each of which is individually controllable and each of which is associated with respective ones of six reference oil cells 34a mounted on the reference oil wheel 34. Each counter counts the number of oil samples of a particular type to be compared against respective reference oil samples. When the proper number of each type of sample has been compared with the proper reference oil, the reference oil wheel is automatically caused to rotate to place the next desired reference oil in position for performing the infra-red test, in accordance with the settings of the counters. It is necessary, of course, that the types of samples be properly grouped when mounted on the automatic feeding sample table 28.

The oil selector switch 25 may also comprise a plurality of individual switches or counters each of which corresponds to a different reference oil cell 34a on reference wheel 34. Each switch or counter may be set to the number of samples of each oil type to be analyzed. As each oil sample is analyzed, the respective switch or counter is stepped down. Alternatively, the sampling pulse counter 24 counts the oil samples analyzed until its count agrees with a setting of a switch or counter, thus indicating that the proper number of samples of a given type have been tested. After the predetermined number of samples of the type corresponding to a particular switch setting have been tested, the wheel 34 is caused to rotate to the next desired position and remains there until the next switch of oil selector switch 25 is stepped down, or otherwise operated on, to cause reference wheel 34 to rotate to the next successive desired position.

A further modification to the infra-red recorder 33 is the provision of an improved sample cell 34a. The normal construction of a sealed sample cell 34a presently known in the art includes a pair of infra-red transparent members having a thin internal cavity of known thickness therebetween. The thin internal cavity is accessible for filling with a sample through an entrance port at one end while an exit port permits the displaced air to be vented at the other end of the cell. The contents of the thin internal cavity are then subjected to testing. The cell may also be filled by sucking the sample in through the entrance port by applying vacuum at the exit port. This type of known cell is satisfactory when used in a system wherein clean, dry cells are filled with a sample for each test performed. The thickness of the internal cavity (appr. 100 microns) generally does not allow the displacement of a previous sample having a high viscosity within the cavity by a subsequent sample in a practical period of time. For example, in the prior art sample cells, when vacuum is applied to the exit port to remove the existing sample within the cell and to simultaneously draw a new sample into the cell via the entrance port, it is not possible to displace the previous sample in a short enough period of time to enable a large number of infra-red tests to be performed in a short period of time. The effects of the high viscosity of the sample and the thin cavity thickness combine to require a displacement time of several minutes. In the apparatus of the present invention the prior art sample cells are suitable for use as reference cells 34a since reference samples are not removed from the reference cells 34a on reference wheel 34.

However, in the present invention, the sample cell 32 located on the infra-red recorder 33 must be purged and a new sample placed therein before each test is performed. The exit port of the sample cell 32 is connected to a vacuum pump and the entrance port of the sample cell 32 is connected to dipper probe 29. When the dipper probe 29 is caused to dip into a sample test tube, the NF controller causes the vacuum pump to be turned on to draw the previous sample out of the sample cell 32 and to simultaneously draw the new sample through the dipper probe 29 and the entrance port of the sample cell 32 to fill the cavity therein.

However, as mentioned above, with sample cells of the previously known construction, it would take several minutes to adequately purge the prior sample from the sample cell 32 to ensure accurate test results with the new sample. Therefore, an improved infra-red cell construction was devised which allows the previous sample to be adequately purged and be replaced by a new sample in an extremely short period of time to insure accurate test results on each sample.

Referring to FIGS. 6a and 6b, there are shown front and sectional views, respectively, of an improved sample cell according to the present invention for use with infra-red recorders or the like. The improved sample cell 32 includes first and second infra-red transparent members 40 and 41 having a thin cavity 42 formed therebetween. The actual analysis area of the portion of cell 32 defined by cavity 42 is represented by the reference designation 43. Grooves 44 and 45 are formed in members 40 and 41 within the cavity area 42 but outside of the actual analysis area 43. When vacuum is applied to exit port 46 to purge the sample presently in the cell and to cause the next sample to be sucked into input port 47, the presence of the grooves 44 and 45 causes a greater volume of liquid flow per unit time within the cavity 42. This increased flow allows the sample quantity within the cavity 42 to be more quickly purged from the cell. In actual practice, it has been found that the grooves 44 and 45 enable an oil sample to be purged from the cell in approximately 45 seconds whereas in the prior art cell constructions, a displacement time of several minutes is required.

FIG. 6c illustrates a typical fluid flow pattern within the cell of the present invention while vacuum is being applied to exit port 46 to purge the contents of the cell and to suck in the next sample via entrance port 47. The fluid flow is indicated by the arrows 48. As suction is applied, the fluid is sucked diagonally across the cell from groove 45 to groove 44. The increased fluid flow per unit time during purging of the cell is due to the fact that the effective length of the flow constricting area (i.e., the thin film zone 42) within the cavity is shortened due to the presence of the grooves which lessen the constriction of the fluid flow.

It is pointed out that the exit and entrance ports 46 and 47, respectively, may be implemented as holes through the side of one or both of the members 40 and 41, the holes being in communication with the cavity area 42 and grooves 44 and 45. Other configurations of input and exit ports may be used in accordance with individual system requirements. Also, the grooves 44 and 45 are shown by way of example. It should be clear that other shapes and sized grooves could be used to provide equivalent results according to the present invention. Also, the grooves could be formed in only one of the transparent members 40 and 41.

The above-described cell is useful in any type of system wherein it is required to purge the contents of a sample cell having a thin cavity area (such as area 42) in a relatively short period of time. The cell 32 according to the present invention is particularly suitable for use with viscous fluids, such as engine oil or the like.

A further modification of the basic infra-red recorder 33 is in the chart drive system in order to only record the "zones" of interest in the entire infra-red spectrum, with continuous operation until shutdown of the system.

By "zones" of interest is meant those portions of the infra-red spectrum which provide the desired information regarding the condition of the oil. For example, the "zone" of interest from 750–1850 cm.$^{-1}$ provides information relating to conditions such as fuel dilution, oxidation, glycol content and nitration, while the "zone" of interest from 3100–3700 cm.$^{-1}$ provides information relating to conditions such as water condensation and glycol content. It should be clear that for applications other than engine oil analysis, other "zones" in the infra-red spectrum may be of interest. In performing engine oil analysis it is only necessary to check certain portions of the infra-red spectrum. It would be desirable to change the speed of the chart recorder in the infra-red apparatus 33 in order to skip over the undesired portions of the infra-red spectrum as quickly as possible, to thereby waste as little time as possible. To accomplish this, a cam 50 and switch 52 arrangement was devised which is connected to a shaft 51 of the chart recorder portion of infra-red apparatus 33 to cause the chart recorder to go into a high speed advance mode during certain portions of the infra-red recording cycle. The rotation of the shaft 51 is correlated with the internal wavelength program of the infra-red apparatus 33. This modification is illustrated in FIG. 7 of the drawings. A cam 50 having predetermined high and low portions 50a and 50b, respectively, is mounted on the shaft 51 of the chart recorder within the infra-red apparatus 33. Mounted in communication with the cam 50 is a microswitch 52 which is connected to the infra-red circuitry via a spectrum window control 53. The switch 52 is selectively operated by the high (50a) and low (50b) portions of cam 50. The positions and dimensions of the high and low portions of cam 50 are correlated with the wave length that is being recorded by the infra-red recorder at predetermined time periods during the operation of the system. When the high point 50a of cam 50 touches microswitch 52, the switch 52 is operated, thereby causing the recording apparatus to operate in its normal record mode. When the low points 50b of cam 50 are at microswitch 52, the microswitch switches its state and causes the shaft 51 to rotate at high speed and disables the recording apparatus until another high point 50a on the cam 50 again operates the microswitch 52. Thus, the recording apparatus is caused to rapidly skip over undesired portions in the infra-red spectrum when the low portions 50b of cam 50 are opposite switch 51. A typical chart indicating the recorded and skipped over portions of the infra-red spectrum is illustrated in FIG. 8. In this embodiment, only the infra-red spectrum in the ranges of 750–1850 cm.$^{-1}$ and 3100–3700 cm.$^{-1}$ are recorded. These are the two "zones" of interest. In other applications the cam may be designed to record other zones of interest.

The microswitch 52 is appropriately connected to the circuitry of the infra-red apparatus 33 as indicated in block form in FIG. 7. The details of the connection of switch 52 with the circuitry is not shown herein. It should be apparent to those ordinarily skilled in the art how to connect switch 52 to the circuitry of infra-red apparatus 33 to perform the above described functions within the spirit of this invention. The circuit diagram of infra-red apparatus 33 is readily available from Perkin-Elmer Co. and appears in the maintenance manual therefor.

Further provided is a spectrum zone control 53 (FIGS. 5 and 7) which is coupled to switch 52 to deactivate the switch 52 so that the recorder records the complete spectrum. Zone control 53 may also be adapted to change the position of switch 52 to record different zones in the spectrum, if desired.

The automatic infra-red recording system of FIG. 5 is started up as follows: The main power unit 23 is switched on, the pulse counter 24 is switched off and the reference oil selector switch 25 is switched off. Power to the remote units in FIG. 5 (NF controller 26, sample table 28, infra-red recorder 33, etc.) is supplied through various relays in the main power supply unit 23. The main switch on the infra-red recorder 33 (not shown) is turned on and the main switch on the NF controller 26 (not shown) is turned on. The dipper control-sample table advance control unit 30 within NF controller 26 contains a timer which is set to an appropriate time period (such as 45 seconds). The main switch on the sample table 28 (not shown) is set at "automatic" and the switch on vacuum pump 27 (not shown) is turned on.

The sample table 28 is then filled with up to 200 samples which are to be analyzed.

A manual start switch on the NF controller 26 (not shown) is depressed in order to start the operation of the system. Control unit 30 then causes dipper probe 29 to dip into the first sample test tube 37 and the vacuum pump 27 simultaneously is turned on to start sucking the sample into the sample cell 32 which is connected to the vacuum pump via vacuum line 38 and to the dipper probe 29. After 45 seconds, the vacuum pump is shut off by the control 30 within the NF controller 26 and the dipper 29 is caused to raise from the sample test tube 37. The sample table 28 is then caused to advance the next sample to the dipper station by the NF controller 26.

After the vacuum pump is shut off, and the sample oil is properly located in the sample cell 32, the infra-red recorder 33 is caused to operate by switching the infra-red recorder 33 from the manual to the automatic mode by means of a toggle switch on the infrared recorder 33. The chart paper is advanced towards the chart take up roller 39 and the "zones" of interest are recorded on the chart. If the spectrum window control 53 is set to "automatic," the chart paper is caused to rapidly advance through the infrared zones between the "zones" of interest by means of the cam 50 and microswitch 52 arrangement of FIG. 6. If control 53 is "off," the complete infra-red spectrum will be recorded. At the end of the recording operation, recorder 33 signals the dipper control and sample table advance control 30 of NF controller 26 to cause the cycle to be repeated.

With the apparatus described above, it is possible to perform an infra-red analysis of an oil sample in approximately 3½ minutes. Since this operation is the most time consuming in the overall computerized operation, an oil sample can be completely analyzed within approximately 3½ minutes and the results fed to a computer for analysis and correlation of the resultant data.

If all of the 200 samples on the sample table 28 are the same type of oil, then only one reference oil in a reference cell 34a on reference oil wheel 34 need be used. However, if for example, 100 samples are of a first type of oil and the next 100 samples are of a second type of oil it will be necessary to program the reference oil wheel 34 by means of setting the sampling pulse counter 24 and reference oil selector switch 25 to automatically change reference oils after the first 100 samples of the first type of oil have been checked. This is done, in this particular example, by appropriately setting the counters within sampling pulse counter 24 to 100. The reference oil selector switch is then set to the proper reference wheel positions containing the desired references oils. After the first 100 samples have been checked, the sampling counter will cause the reference oil selector switch 25 to rotate the reference oil wheel 34 until the desired reference cell 34a is aligned in the optical path of the infra-red recorder 33. This operation is in synchronism with the remainder of the apparatus of FIG. 5.

What is claimed is:
1. Apparatus for analyzing a plurality of oil samples and for reporting the results thereof, comprising:
   a viscometer for measuring the viscosity of said oil samples;
   means for successively determining the metals content of said plurality of oil samples;
   means for successively determining the infra-red absorbance characteristics of said plurality of oil samples;
   said infra-red absorbance characteristics determining means including:
   a sample station;
   a sample cell;
   a reference cell;
   means for automatically positioning a sample at said sample station;

means for feeding a sample positioned at said sample station to said sample cell;

means for determining the infra-red characteristics, with respect to the contents of said reference cell, of the sample positioned at said sample station after said sample is fed to said sample cell, and means coupled to said positioning means to position the next successive sample at said sample station after the infra-red characteristics of the previous sample have been determined;

a digital computer apparatus; and means for feeding the results of said viscosity, metals content and infra-red analyses to said computer apparatus;

said computer apparatus including:

first means storing reference information regarding limit values of viscosity, metals content and infra-red characteristics of oil, means for evaluating said infra-red characteristics and comparing the results of said evaluation with said respective stored infra-red reference information, means for comparing the results of said viscosity and metals content analyses with said respective stored reference information, second means storing evaluation criterion correlating comparative values of viscosity, metals content and infra-red characteristics of the oil with oil condition, means relating said comparison results with said evaluation criteria, and means responsive to said relating and to said comparison means for generating report forms tabulating said comparison results and to said relating results for each of said oil samples, said report form demonstrating the condition of the oil samples.

2. Apparatus according to claim 1 further comprising:

means storing evaluation criteria correlating comparative values of viscosity, metals content and infra-red characteristics of the oil with engine conditions;

means relating said comparison results with said engine condition evaluation criteria;

said generating means being responsive to said comparison results and to said engine condition relating results for generating on said report form indicia indicating the condition of the engine from which said sample was removed.

3. Apparatus according to claim 1 wherein said digital computer apparatus further comprises means for storing said comparison results and said relating results corresponding to a predetermined plurality of samples prior to generating said report forms.

4. Apparatus according to claim 3 wherein said generating means generates a report form for each of said predetermined plurality of samples after said comparison and relating results for each of said predetermined plurality of samples is stored.

5. Apparatus according to claim 1 wherein said computer apparatus further comprises means for checking the validity of the results of said viscosity, metals content and infra-red tests of each of said samples prior to analysis thereof by said computer.

6. Apparatus according to claim 1 wherein said digital computer apparatus further comprises means for storing the results of said viscosity, metals content and infra-red tests of a plurality of oil samples prior to analysis by said computer.

7. Apparatus according to claim 1 wherein said comparison means includes means for recognizing abnormal conditions, said computer further comprising alarm means responsive to said recognition for immediately generating an alarm signal.

8. Apparatus according to claim 7 wherein said relating means includes means for recognizing abnormal conditions, said alarm means being responsive to said recognition by said relating means for generating an alarm signal.

9. Apparatus according to claim 7 wherein said alarm means indicates the nature of said abnormal condition responsive to said recognition.

10. Apparatus according to claim 1 wherein said first storage means stores information regarding trend values of viscosity, metals content and infra-red characteristics of oil samples from an engine, and wherein said comparison means compares said trend information with test information from an oil sample from said engine.

11. Apparatus according to claim 10 wherein said comparison means includes means for recognizing abnormal trends of data for an engine, said computer further comprising alarm means responsive to recognition of said abnormal trend for generating an alarm signal.

12. Apparatus according to claim 1 wherein said infra-red apparatus further comprises switching means coupled to said determining means for determining the infra-red characteristics for only predetermined zones of the infra-red spectrum and for rapidly skipping over the remaining zones of the infra-red spectrum.

13. Apparatus according to claim 12 wherein said infra-red apparatus includes means for recording said infra-red characteristics and wherein said switching means includes:

a cam mounted on a shaft whose rotation is in synchronism with the recording means of said infra-red apparatus;

a switch mounted in communication with said cam; and means coupling said switch to said recording means for disabling said recording means and switching said recording means into a high-speed transport mode during said remaining zones of the infra-red spectrum.

14. Apparatus according to claim 1 wherein said infra-red apparatus comprises:

a plurality of reference cells containing reference substances mounted on a carrier; and means coupled to said carrier for locating a first of said reference cells in position such that the infra-red characteristics of a sample can be compared with the infra-red characteristics of the contents of said first reference cell.

15. Apparatus according to claim 14 wherein said locating means automatically positions a second of said reference cells in said comparison position after the infra-red characteristics of a predetermined number of samples have been compared with the contents of said first reference cell.

16. Apparatus according to claim 1 wherein said sample cell comprises first and second substantially transparent elements secured together and defining a sample chamber therebetween, a groove being formed in one of said elements within said chamber for enabling a sample to be quickly purged from said sample cell.

17. Apparatus according to claim 16 wherein said sample cell includes an infra-red transparent window portion through which the infra-red characteristics of the contents of said chamber is measurable, said groove being formed adjacent said window portion within said chamber.

18. Apparatus according to claim 17 wherein a second groove is formed in a transparent element, each groove being formed adjacent to opposite sides of said window portion within said chamber.

19. Apparatus according to claim 1 wherein said feeding means includes:

a dipper probe mounted on said positioning means for dipping into said sample after said sample is positioned at said sample station;

means carrying said sample from said dipper probe to said sample cell;

a vacuum pump coupled to said sample cell for sucking a sample through said carrying means and into said sample cell; and means for operating said vacuum pump after said dipper probe has dipped into said sample.

20. Apparatus according to claim 19 wherein said vacuum pump further includes a waste line for disposing of samples sucked out from said sample cell.

21. Apparatus according to claim 1 further comprising means coupled to said means for determining said infra-red characteristics for converting the determined infra-red information to computer compatible data signals.

References Cited
FOREIGN PATENTS 1,392,494   12/1965   France.

LOUIS R. PRINCE, Primary Examiner

J. W. ROSKOS, Assistant Examiner

U.S. Cl. X.R.

73—116; 250—43.5; 356—70